United States Patent [19]

Inoue et al.

[11] Patent Number: 4,840,986

[45] Date of Patent: Jun. 20, 1989

[54] PROCESS FOR PRODUCING A POLYARYLENE SULFIDE

[75] Inventors: Hiroshi Inoue; Toshikazu Kato; Satoshi Tomagou; Noriaki Emura, all of Mie, Japan

[73] Assignee: Tosoh Corporation and Toso Susteel Co., Ltd., Japan

[21] Appl. No.: 165,062

[22] Filed: Mar. 7, 1988

[30] Foreign Application Priority Data

Mar. 6, 1987 [JP] Japan .................................. 62-49913

[51] Int. Cl.$^4$ ............................................. C08G 75/14
[52] U.S. Cl. .................................... 524/436; 524/779; 525/537; 528/388
[58] Field of Search ................ 524/436, 779; 525/537; 528/388

[56] References Cited

U.S. PATENT DOCUMENTS

| | | |
|---|---|---|
| 4,038,263 | 7/1977 | Edmonds et al. |
| 4,495,332 | 1/1985 | Shiiki et al. ........................ 524/800 |
| 4,588,789 | 5/1986 | Scoggins et al. ..................... 528/388 |
| 4,645,828 | 2/1987 | Iizuka et al. ........................ 528/388 |

FOREIGN PATENT DOCUMENTS

| | | |
|---|---|---|
| 3368 | 2/1970 | Japan . |
| 12240 | 4/1977 | Japan . |
| 7332 | 1/1986 | Japan . |
| 150751 | 7/1987 | Japan . |

*Primary Examiner*—John C. Bleutge
*Assistant Examiner*—David W. Woodward
*Attorney, Agent, or Firm*—Sughrue, Mion, Zinn, Macpeak & Seas

[57] ABSTRACT

A polyarylene sulfide having a high molecular weight is produced at low cost and without causing any pollution problems through a polymerization reaction between a dihalogenated aromatic compound and an alkali metal sulfide in an aprotic polar solvent by adding from about 0.05 to about 5 moles of calcium chloride per mole of the dihalogenated aromatic compound after the conversion of the dihalogenated aromatic compound has reached about 60 to about 98 mol % and allowing the reaction to proceed. Such a polyarylene sulfide is very useful for utilization in extrusion of films, fibers, etc.

5 Claims, No Drawings

PROCESS FOR PRODUCING A POLYARYLENE SULFIDE

BACKGROUND OF THE INVENTION

1. Field of Invention

This invention relates to a process for producing a polyarylene sulfide and, more particularly, to a process for producing a polyarylene sulfide having a high molecular weight.

Polyarylene sulfides (for example, a polyphenylene sulfide) having excellent heat resistance and excellent chemical resistance have attracted great interest in regard to their potential for use in electric and electronic components as well as automotive parts. Being moldable into various formed parts, films, sheets, fibers, etc. by injection, extrusion or other molding processes, polyarylene 5 sulfides are widely used in fields where heat resistance or chemical resistance is needed.

2. Prior Art

Japanese Patent Publication No. 3368/1970 discloses a process for producing a polyarylene sulfide wherein the reaction between a dihalogenated aromatic compound and an alkali metal sulfide such as sodium sulfide or the like is conducted in an aprotic polar solvent such as N-methyl-2-pyrrolidone.

However, the molecular weight of the polymer obtained by this process is not sufficiently high to be used for injection molding or the like. Therefore, this low-molecular weight polymer is heated in the air so as to be crosslinked through oxidation, thereby enabling the polymer to be used in a molding process. However, even such a polymer having an increased molecular weight suffers from inferior extrudability which may be attributed to the high level of crosslinking and branching, so that it has heretofore been difficult to form said polymer into films or fibers.

Under these circumstances, processes for obtaining a high-molecular weight polyarylene sulfide through polymerization reaction have been proposed. A typical example of this type of prior art is a process disclosed in Japanese Patent Publication No. 12240/1977 in which polymerization reaction is conducted in the presence of R-COOM (wherein R is a hydrocarbyl group and M is an alkali metal) which is employed as a polymerization auxiliary. The high-molecular weight polymer obtained in this way is considered to be excellent in terms of extrudability and hence applicable to formation of films, fibers, etc.

The above-described process, however, suffers from the following problems. Namely, the polymerization auxiliary that is used in the process is required in an amount which is substantially equimolecular with that of sodium sulfide, and the lithium acetate which is effective in increasing the molecular weight is costly. Accordingly, the production cost is unfavorably high and the process is therefore disadvantageous from the industrial point of view. The process has the additional problem that, since polymerization is carried out in the presence of a large amount of a water-soluble salt of an organic acid, a large amount of salt of an organic acid is mixed in waste water discharged from the processing step carried out after the polymerization which may give rise to pollution-related problems, and it is costly to remove the contaminant.

U.S. Pat. No. 4,038,263 discloses a process wherein lithium halide is used as a polymerization auxiliary. Employment of lithium halide enables elimination of the pollution problem and the problem concerning waste water treatment. However, since lithium halide is costly, the problem of high production costs still remains unsolved.

Japanese Patent Public Disclosure No. 7332/1986 discloses a process wherein polymerization is carried out in two stages in such a manner that water is added to the reaction product after the first stage of polymerization and the second stage of polymerization is then conducted at a raised temperature. This process enables elimination of the pollution problem and the problem concerning high production costs resulting from the use of a costly polymerization auxiliary. However, examination of this prior art process conducted by the present inventors has revealed that this process lacks effectiveness in increasing the molecular weight and, since the pressure during the second stage of polymerization is considerably high, a high-pressure reaction vessel must be used and the fixed cost is therefore increased.

SUMMARY OF INVENTION

It is therefore an object of the present invention to provide an improved process for producing a polyarylene sulfide having a high molecular weight at low cost and without involving any problems of pollution.

Other objects and advantages of the present invention will become apparent to those skilled in the art from the following description and disclosure.

DETAILED DESCRIPTION OF INVENTION

The present invention relates to a process for producing a polyarylene sulfide through a polymerization reaction between a dihalogenated aromatic compound and an alkali metal sulfide in an aprotic polar solvent, said process comprising adding from about 0.05 to about 5 moles of calcium chloride per mole of the dihalogenated aromatic compound after the conversion of the dihalogenated aromatic compound has reached about 60 to about 98 mol %, and continuing the reaction.

Unlike lithium chloride, calcium chloride has adverse effects on the polymerization reaction if it is present in the polymerization system from the early stages of polymerization. However, the present inventors have found that, if calcium chloride is added to the system after the polymerization has already proceeded to a certain extent, it is possible to achieve an increase in the molecular weight without impairing the polymerization reaction. The present invention has been accomplished on the basis of this finding. The resent invention will be described hereinunder in detail.

The polymerization auxiliary which is employed in the present invention is calcium chloride. Calcium chloride is commercially available in the form of anhydride, dihydrate, hexahydrate, aqueous calcium chloride solutions, etc., which are all usable in the present invention. The amount of calcium chloride added is usually from about 0.05 to about 5 moles, more preferably from about 0.1 to about 3 moles, per mole of a dihalogenated aromatic compound. If the amount of calcium chloride is excessively small, the resulting polymer unfavorably possesses a reduced molecular weight, whereas, if said amount is excessively large, it becomes difficult to stir the mixture in the reaction vessel. Calcium chloride is added at the time when the conversion of the dihalogenated aromatic compound in the system has reached about 60 to about 98 mol %. A conversion less than 60 mol % lowers the yield of the resulting polymer and may result in no increase in the molecular weight. Conversely, a conversion in excess of 98 mol % makes it difficult to obtain a polyarylene sulfide having a high molecular weight even if the reaction is continued thereafter. It is more preferable to add calcium chloride at the time when the conversion has reached about 85 to about 97 mol %.

The conversion of the dihalogenated aromatic compound (hereinafter referred to as "DHAr") is calculated using the following formula (it should be noted that the alkali metal sulfide will be hereinafter referred to as "AMS"):

Conversion (%) = 100−{(the amount (mole) of remaining DHAr−the amount (mole) of excess DHAr−the amount (mole) of AMS disappearing during dehydration)/the amount (mole) of DHAr charged}×100

In the above formula, the amount of excess DHAr means an excess of DHAr in the case where DHAr is charged in an amount which is larger than the equimolecular amount with respect to AMS. The amount of AMS disappearing during dehydration means the amount of AMS which decomposes to hydrogen sulfide and disappears when it is being partially dehydrated in an aprotic polar solvent.

Examples of the alkali metal sulfide usable in the present invention include lithium sulfide, sodium sulfide, potassium sulfide, rubidium sulfide, cesium sulfide, and a mixture thereof. These alkali metal sulfides are obtained from the reaction between alkali metal hydrosulfides and alkali metal bases or between hydrogen sulfide and alkali metal bases. The alkali metal sulfides may be prepared in the polymerization system in situ prior to the addition of a dihalogenated aromatic compound into the system, or may be prepared outside the system and then added thereto. Among the above-described alkali metal sulfides, sodium sulfide is most preferably used in the present invention. The amount of water remaining in the system is preferably from about 0.3 to about 5.0 moles per mole of alkali metal sulfide. It is possible to change the amount of water in the system in the course of polymerization.

Examples of dihalogenated aromatic compounds usable in the present invention include p-dichlorobenzene, m-dichlorobenzene, o-dichlorobenzene, p-dibromobenzene, p-diiodobenzene, dichloronaphthalene, dibromonaphthalene, dichlorodiphenyl sulfone, dichlorobenzophenone, dichlorodiphenyl ether, dichlorodiphenyl sulfide, dichlorodiphenyl, dibromodiphenyl, dichlorodiphenyl sulfoxide and mixtures thereof. Among them, p-dihalogenated benzenes are preferable, and p-dichlorobenzene is particularly preferable. Further, a small amount of polyhalogenated aromatic compound, for example, trichlorobenzene, tribromobenzene, triiodobenzene, tetrachlorobenzene, trichloronaphthalene, tetrachloronaphthalene, etc., may be used in combination in such a range that the linearity of the resulting polymer will not be affected.

Preferable polymerization solvents usable in the present invention are polar solvents, particularly preferably aprotic polar solvents which are stable to alkalis at high temperatures. Examples of them include N,N-dimethylacetamide, N,N-dimethylformamide, hexamethylphosphoramide, N-methyl-ε-caprolactam, N-ethyl-2-pyrrolidone, N-methyl-2-pyrrolidone (hereinafter referred to as "NMP"), 1,3-dimethyl-2-imidazolidinone, dimethyl sulfoxide, sulfolane, tetramethylurea and mixtures thereof.

Polymerization in the present invention is conducted ordinarily at about 200° to about 300° C., preferably about 200° to about 270° C., for about 0.5 to about 30 hours, preferably about 1 to about 15 hours, with stirring. It should be noted that it is preferable to conduct polymerization at a relatively low temperature, i.e., from about 200° to about 250° C., before calcium chloride is added with a view to stably controlling the conversion of the dihalogenated aromatic compound. The amount of the dihalogenated aromatic compound used in the present invention is usually in the range of about 0.95 to about 1.10 moles per mole of an alkali metal sulfide, and the amount of an aprotic polar solvent usable in the present invention is in such a range that the amount of polymer produced by the polymerization is about 5 to about 60% by weight, preferably about 10 to about 50% by weight, with respect to the solvent.

Separation of the polyarylene sulfide from the reaction mixture obtained in this way may be effected using conventional techniques. Examples of separation means usable in the present invention include a method wherein the solvent is recovered by distillation, flashing or the like and the resulting polymer is washed with water before the final product is obtained, and a method wherein the reaction mixture is filtered and the solvent is recovered, and the resulting polymer is washed with water before the final product is obtained. However, it is preferable in order to prevent coloring of the resulting polymer and formation of a gel to adopt a method wherein the polymer is subjected to minimum heat history, that is, a method wherein, after the reaction mixture has been filtered and the solvent has been recovered, the resulting polymer is washed with water and then obtained.

A typical practical example of polyarylene sulfides produced by the process of the present invention may be poly-(p-phenylene sulfide

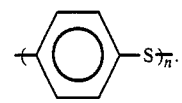

Examples of other polyarylene sulfides that pro by the present invention include polyphenylene sulfide sulfone

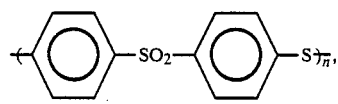

polyphenylene sulfide ketone

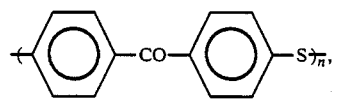

polyphenylene sulfide ether

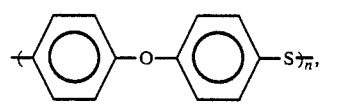

polydiphenylene sulfide 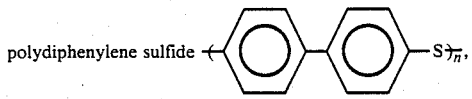

and copolymers including two or more repeating units such as those mentioned above.

The polyarylene sulfide obtained according to the present invention is a straight-chain polymer and has an increased molecular weight and is therefore suitable for use in the form of extruded articles such as fibers, films, pipes, etc., in addition to injection-molded articles. The polyarylene sulfide may be mixed as desired with a reinforcing filler, for example, ceramic fibers such as glass fiber, carbon fiber and alumina fiber, aramid fiber, all aromatic polyester fiber, metal fiber, rock fiber and potassium titanate whisker, an inorganic filler and an organic or inorganic pigment, for example, calcium carbonate, mica, talc, silica, barium sulfate, calcium sulfate, kaolin, clay, pyroferrite, bentonite, sericite, zeolite, nepheline syenite, attapulgite, wollastonite, ferrite, calcium silicate, magnesium carbonate, dolomite, antimony trioxide, zinc oxide, titanium oxide, magnesium oxide, iron oxide, molybdenum disulfide, graphite, gypsum, glass bead, glass powder, glass balloon, quartz, and quartz glass.

Further, it is also possible to add as desired a plasticizer such as an aromatic hydroxy derivative, a mold releasing agent, a silane or titanate coupling agent, a lubricant, a heat-temperature stabilizer, a weather resistance stabilizer, a crystal nucleus agent, a foaming agent, an anticorrosive agent, an ion trapping agent, a flame retarder, a flame retardant auxiliary, etc.

According to need, it is also possible to mix one or more material selected from the group consisting of polyethylene, polybutadiene, polyisoprene, polychloroprene, polystyrene, polybutene, poly-$\ominus$-methylstyrene, polyvinyl acetate, polyvinyl chloride, polyacrylic ester, polymethacrylic ester, polyacrylonitrile, polyamides such as nylon 6, nylon 66, nylon 610, nylon 12, nylon 11, and nylon 46, polyesters such as polyethylene terephthalate, polybutyrene terephthalate, and polyarylate, polyurethane, polyacetal, polycarbonate, polyphenylene oxide, polysulfone, polyether sulfone, polyarylsulfone, polyether ketone, polyether ether ketone, polyimide, polyamide imide, silicone resin, phenoxy resin, and fluorine resin, and their random, block or graft copolymers.

EXAMPLES

The present invention will be explained more specifically below by way of Examples. However, the present invention is in no way restricted to these Examples.

The melt viscosity of the polyarylene sulfides produced in the following examples and Comparative Examples was measured with a koka flow tester (die: diameter =0.5 mm; length =2 mm) at about 300° C. and under a load of 10 kg.

EXAMPLE 1

In a 500-ml autoclave were placed about 0.40 mole of $Na_2S$ $2.7H_2O$ and 150 ml of NMP. They were heated to about 210° C. with stirring in a stream of nitrogen, whereby about 12.0 g of water and about 2.0 g of NMP were removed by distillation. During this dehydration, about 0.008 mole of sodium sulfide decomposed to hydrogen sulfide and disappeared. Then, the system was cooled to about 170° C. and about 0.40 mole of p-dichlorobenzene (hereinafter referred to as "p-DCB") was added together with 50 ml of NMP. The system was sealed and heated in a stream of nitrogen. Polymerization was conducted for about 5 hours at about 220° C. After the completion of the polymerization, the system was cooled to room temperature, and the amount of p-DCB remaining in the slurry was measured by gas chromatography, and the conversion of the p-DCB was calculated using the above-described formula. The conversion was about 95 mol %.

Then, about 0.12 mole of calcium chloride anhydride was added to the above-described polymerization system, and polymerization was further conducted for about 5 hours at about 260° C. After the completion of the polymerization, the system was cooled. Then, the resulting polymer was washed with about 5 l of hot water, subjected to repeated filtration, washed with methanol once, and then vacuum-dried overnight by heating to obtain a granular polyphenylene sulfide. The yield and melt viscosity of the polymer were about 90% and about 78 Pa.s, respectively.

EXAMPLES 2 to 11

The procedure of Example 1 was repeated with the following reaction conditions variously changed: the charge concentration (the number of moles of p-DC per liter of NMP), the charged monomer ratio (the molar ratio of $Na_2S$ to p-DCB), the polymerization time, the kind of calcium chloride, and the amount of calcium chloride added (the molar ratio of $CaCl$ to p-DCB). The results are shown in Table 1.

EXAMPLES 12 to 16

The procedure of Example 1 was repeated except that the charge concentration, the polymerization time and the amount of calcium chloride were variously changed and 1,2,4-trichlorobenzene (hereinafter referred to as "TCB") was added together with calcium chloride. The results are shown in Table 1.

COMPARATIVE EXAMPLE 1

The procedure of Example 1 was repeated except that no calcium chloride was added. As a result, a polymer in powder form was obtained. The yield and melt viscosity of the polymer were about 94% and about 14 Pa.s, respectively, which were lower than those of the polymers obtained in the above-described Examples. (see Table 1).

COMPARATIVE EXAMPLE 2

About 0.20 mole of calcium chloride was added to sodium sulfide, and the mixture was dehydrated in the same way as in Example 1. After p-DCB and NMP were charged, polymerization was conducted for about 5 hours at about 260° C. As a result, a polymer in the form of powder was obtained. The yield and melt viscosity of the polymer were about 62% and less than about 3 Pa.s, respectively. (see Table 1).

COMPARATIVE EXAMPLE 3

Dehydration was carried out in the same way as in Example 1. After the polymerization system had been cooled to about 170° C., about 0.20 mole of calcium chloride was added together with p-dichlorobenzene and NMP, and polymerization was conducted for about 5 hours at about 260° C. As a result, a polymer in the form of powder was obtained. The yield and melt viscosity of the polymer were about 63% and less than about 3 Pa.s, respectively. (see Table 1).

COMPARATIVE EXAMPLE 4

The procedure of Example 1 was repeated except that polymerization was conducted for about 5 hours at about 260° C. before the addition of calcium chloride. As a result, a granular polymer was obtained. Although the yield of the polymer was about 93%, the melt viscosity thereof was about 11 Pa.s, which was lower than those of the polymers obtained in the above-described Examples. (see Table 1).

As is obvious from the above explanation, the present invention provides a polyarylene sulfide having a high molecular weight at low cost and without causing any problems of pollution. The polyarylene sulfide thus obtained is particularly suitable for use in extrusion of films, fibers, etc.

hours with stirring, said process comprising adding from about 0.05 to about 5 miles of calcium chloride per mole of the dihalogenated aromatic compound after the conversion of the dihalogenated aromatic compound has reached about 60 to about 98 mol % and allowing the reaction to proceed.

2. The process according to claim 1 wherein the amount of calcium chloride is about 0.1 to about 3 moles per mole of the dihalogenated aromatic compound.

3. The process according to claim 1 wherein the calcium chloride is added to the reaction system after the conversion of the dihalogenated aromatic compound has reached about 85 to about 97 mol %, the reaction then being allowed to proceed.

4. The process according to claim 1 wherein the polymerization reaction is conducted at a temperature of from about 200° to about 270° C. for about 1 to about 15 hours with stirring.

TABLE 1

| | Polymerization conditions before addition of $CaCl_2$ | | | | | | | Polymerization conditions after addition of $CaCl_2$ | | | | | |
|---|---|---|---|---|---|---|---|---|---|---|---|---|---|
| | Charge concentration (mole/L) | $Na_2S$/ p-DCB (molar ratio) | $H_2O$/ $Na_2S$ (molar ratio) | Polymerization temperature (°C.) | Polymerization time (hr) | Conversion (mol %) | $CaCl_2$ | $CaCl_2$/ p-DCB (molar ratio) | TCB/ p-DCB (molar ratio) | Polymerization temperature (°C.) | Polymerization time (hr) | Conversion (mol %) | Yield (%) | Melt viscosity (Pa.S) |
| Ex. 1 | 2.0 | 0.98 | 1.2 | 220 | 5 | 95 | anhydride | 0.30 | 0 | 260 | 5 | 97 | 90 | 78 |
| 2 | 2.0 | 1.00 | 1.2 | 220 | 5 | 94 | anhydride | 0.30 | 0 | 260 | 5 | 97 | 93 | 65 |
| 3 | 2.0 | 0.98 | 1.2 | 220 | 5 | 96 | anhydride | 0.50 | 0 | 260 | 5 | 98 | 91 | 124 |
| 4 | 2.0 | 0.98 | 1.1 | 220 | 5 | 95 | anhydride | 1.00 | 0 | 260 | 5 | 97 | 90 | 120 |
| 5 | 2.0 | 0.98 | 1.1 | 220 | 5 | 96 | dihydrate | 0.30 | 0 | 260 | 5 | 99 | 92 | 82 |
| 6 | 2.0 | 0.98 | 1.1 | 220 | 5 | 96 | dihydrate | 0.50 | 0 | 260 | 5 | 99 | 92 | 103 |
| 7 | 2.0 | 0.98 | 1.1 | 220 | 5 | 96 | hexahydrate | 0.50 | 0 | 260 | 5 | 98 | 93 | 85 |
| 8 | 2.0 | 0.98 | 1.1 | 220 | 1 | 66 | anhydride | 0.30 | 0 | 260 | 5 | 98 | 72 | 61 |
| Ex. 9 | 2.0 | 0.98 | 1.1 | 220 | 3 | 90 | anhydride | 0.30 | 0 | 260 | 5 | 98 | 92 | 76 |
| 10 | 3.0 | 0.98 | 1.3 | 220 | 5 | 94 | anhydride | 0.30 | 0 | 260 | 5 | 99 | 91 | 129 |
| 11 | 3.0 | 1.00 | 1.6 | 220 | 5 | 95 | anhydride | 0.30 | 0 | 260 | 5 | 99 | 90 | 89 |
| 12 | 2.0 | 0.98 | 1.1 | 220 | 5 | 94 | anhydride | 0.50 | 0.003 | 260 | 5 | 99 | 93 | 354 |
| 13 | 2.0 | 0.98 | 1.1 | 220 | 5 | 94 | anhydride | 0.30 | 0.003 | 260 | 5 | 97 | 91 | 248 |
| 14 | 2.0 | 0.98 | 1.1 | 220 | 5 | 94 | anhydride | 0.30 | 0.003 | 260 | 10 | 99 | 94 | 452 |
| 15 | 2.0 | 0.98 | 1.0 | 220 | 5 | 94 | anhydride | 0.30 | 0.003 | 260 | 15 | 100 | 94 | 384 |
| 16 | 3.0 | 0.98 | 1.2 | 220 | 5 | 96 | anhydride | 0.30 | 0.002 | 260 | 5 | 99 | 91 | 344 |
| Comp. Ex. 1 | 2.0 | 0.98 | 1.1 | 220 | 5 | 95 | — | 0.00 | 0 | 260 | 5 | 97 | 94 | 14 |
| 2 | 2.0 | 0.98 | 1.1 | — | — | 0 | anhydride | 0.50 | 0 | 260 | 5 | 58 | 62 | <3 |
| 3 | 2.0 | 0.98 | 1.2 | — | — | 0 | anhydride | 0.50 | 0 | 260 | 5 | 62 | 63 | <3 |
| 4 | 2.0 | 0.98 | 1.0 | 260 | 5 | 99 | anhydride | 0.30 | 0 | 260 | 5 | 99 | 93 | 11 |

What is claimed is:

1. A process for producing a polyarylene sulfide through a polymerization reaction between a dihalogenated aromatic compound and an alkali metal sulfide in an aprotic polar solvent at a temperature of from about 200° to about 270° C. for about 0.5 to about 30

5. The process according to claim 1 wherein the polymerization reaction is conducted at a temperature of from about 200° to about 250° C. before calcium chloride is added to the reactant.

* * * * *

UNITED STATES PATENT AND TRADEMARK OFFICE
CERTIFICATE OF CORRECTION

PATENT NO. : 4,840,986

DATED : June 20, 1989

INVENTOR(S) : Hiroshi INOUE; Toshikazu KATO; Satoshi TOMAGOU; and Noriaki EMURA It is certified that error appears in the above-identified patent and that said Letters Patent is hereby corrected as shown below:

In Claim 1 (in column 8, line 2), delete "miles" and insert --moles--.

Signed and Sealed this

Fifth Day of June, 1990

Attest:

HARRY F. MANBECK, JR.

*Attesting Officer*  *Commissioner of Patents and Trademarks*